United States Patent
Yang et al.

(10) Patent No.: US 9,146,592 B2
(45) Date of Patent: Sep. 29, 2015

(54) MAGNET FIXING STRUCTURE AND ELECTRONIC DEVICE HAVING THE SAME

(71) Applicant: Wistron Corporation, New Taipei (TW)

(72) Inventors: Kai-Hsiang Yang, New Taipei (TW); Che-Wen Liu, New Taipei (TW); Yu-Ju Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 109 days.

(21) Appl. No.: 14/083,425

(22) Filed: Nov. 18, 2013

(65) Prior Publication Data

US 2015/0102193 A1 Apr. 16, 2015

(30) Foreign Application Priority Data

Oct. 15, 2013 (TW) .............................. 102137152 A

(51) Int. Cl.
- *G06F 1/16* (2006.01)
- *F16M 13/02* (2006.01)
- *E05B 65/00* (2006.01)

(52) U.S. Cl.
CPC .......... *G06F 1/1679* (2013.01); *E05B 65/0067* (2013.01); *F16M 13/02* (2013.01)

(58) Field of Classification Search
CPC .... E05B 65/0067; G06F 1/1679; F16M 13/02
USPC ........ 248/206.5, 683; 292/251.5; 361/679.57, 361/679.58
See application file for complete search history.

(56) References Cited

U.S. PATENT DOCUMENTS

| | | | | |
|---|---|---|---|---|
| 5,312,144 A * | 5/1994 | Yoshida et al. | ............ | 292/251.5 |
| 8,009,424 B2 * | 8/2011 | Zhu et al. | ................. | 361/679.58 |
| 8,251,411 B2 * | 8/2012 | Yang | ........................... | 292/251.5 |
| 8,908,366 B2 * | 12/2014 | Wu | .......................... | 361/679.27 |
| 2005/0167992 A1 * | 8/2005 | Lo et al. | ..................... | 292/251.5 |
| 2007/0138806 A1 * | 6/2007 | Ligtenberg et al. | ........ | 292/251.5 |
| 2008/0136197 A1 * | 6/2008 | Lin | ............................ | 292/251.5 |
| 2008/0179897 A1 * | 7/2008 | Wu et al. | .................... | 292/251.5 |

(Continued)

FOREIGN PATENT DOCUMENTS

| | | |
|---|---|---|
| TW | M348452 | 1/2009 |
| TW | 201311092 | 3/2013 |

OTHER PUBLICATIONS

"Office Action of Taiwan Counterpart Application," issued on Jan. 26, 2015, with English translation thereof, p. 1-p. 10, in which the listed foreign reference was cited.

*Primary Examiner* — Ryan Kwiecinski
(74) *Attorney, Agent, or Firm* — Jianq Chyun IP Office

(57) ABSTRACT

A magnet fixing structure includes a bottom wall, stopping units, a top wall and an elastic arm. The stopping units are connected to the bottom wall. The top wall is connected to the stopping units. A containing space is formed between the bottom and top walls. The elastic arm disposed on the bottom wall has a protrusion. A passage connected to the containing space is formed between the elastic arm and one stopping unit. When a magnet resists elastic force of the elastic arm to pass the passage along a first axis and partially move into the containing space, parts of the stopping units stop the magnet moving along a second axis, the bottom wall and the top wall stop the magnet moving along a third axis, and the protrusion stops the magnet moving along the first axis. Besides, an electronic device having the magnet fixing structure is also provided.

14 Claims, 4 Drawing Sheets

(56) References Cited

U.S. PATENT DOCUMENTS

| | | | |
|---|---|---|---|
| 2010/0270817 A1* | 10/2010 | Yu | 292/251.5 |
| 2011/0031766 A1* | 2/2011 | Huang et al. | 292/251.5 |
| 2012/0242093 A1* | 9/2012 | Liang et al. | 292/96 |
| 2012/0268902 A1* | 10/2012 | Liang et al. | 361/747 |
| 2012/0287595 A1* | 11/2012 | Liang et al. | 361/810 |
| 2013/0016460 A1* | 1/2013 | Yeh et al. | 361/679.01 |
| 2013/0052841 A1 | 2/2013 | Liang | |
| 2014/0312628 A1* | 10/2014 | Yuan | 292/121 |

* cited by examiner

MAGNET FIXING STRUCTURE AND ELECTRONIC DEVICE HAVING THE SAME

CROSS-REFERENCE TO RELATED APPLICATION

This application claims the priority benefit of Taiwan application serial no. 102137152, filed on Oct. 15, 2013. The entirety of the above-mentioned patent application is hereby incorporated by reference herein and made a part of this specification.

BACKGROUND

1. Field of the Invention

The invention is related to a magnet fixing structure and more particularly, to a magnet fixing structure and an electronic device having the same.

2. Description of Related Art

Advancement of semiconductor devices and display technology leads to continuous development of electronic devices towards compactness, capabilities for performing multiple functions, and portability. Common portable electronic devices include tablet PCs, smart phones, notebook computers, and so forth.

Taking the notebook computers for example, a typical notebook computer can be divided two parts, a display device and a host, and the two parts are pivoted to each other, such that the display device can be opened or closed relatively to the host. When the display device is closed relatively to the host, the closed state has to be maintained to prevent the display device from being unexpectedly opened relatively to the host. A common way to maintain the closed state of the notebook computer is using a magnetic attraction force provided by at least one magnet. In the conventional design, the magnet is commonly fixed to at least one machine body of the notebook computer by means of adhering. However, such fixing means results in falling off of the magnet. Moreover, in some notebook computers, an iron member or a magnetic component made of any other material is fused to the machine body of the notebook computer so as to fix the magnet by the magnetic attraction force between the iron member and the magnet. Such fixing means has a defect that the fused structure is difficult for a rework process, and during manufacturing and delivery processes, the magnet is easy to be magnetically attracted by other magnetic components to fall from the machine body.

SUMMARY

The invention provides a magnet fixing structure capable of stably fixing a magnet, such that the magnet may be conveniently assembled to and disassembled from the magnet fixing structure for a rework process.

The invention is related to an electronic device whose magnet fixing structure may stably fix a magnet, and the magnet may be conveniently assembled to and disassembled from the magnet fixing structure for a rework process.

The invention provides a magnet fixing structure adapted to fix a magnet. The magnet fixing structure includes a bottom wall, a plurality of stopping units, a top wall and an elastic arm. The stopping units are connected to the bottom wall. The top wall is connected to the stopping units. The bottom wall and the top wall have a gap therebetween to from a containing space. The elastic arm is disposed on the bottom wall and has a first protrusion. A passage is formed between the elastic arm and one of the stopping units and connected to the containing space and the first protrusion is located in the passage. The magnet is adapted to resist an elastic force of the elastic arm to pass the passage along a first axis and at least partially move into the containing space. When the magnet is at least partially located in the containing space, a part of the stopping units stop the magnet from moving along a second axis, the bottom wall and the top wall stop the magnet from moving along third axis, and the first protrusion stops the magnet from moving along the first axis. The first axis is perpendicular to the second axis, and the third axis is perpendicular to the first axis and to the second axis.

The invention is related to an electronic device including a first body, a second body, a magnet and a magnet fixing structure. The second body is pivoted to the first body. The magnet fixing structure includes a bottom wall, a plurality of stopping units, a top wall and an elastic arm. The stopping units are connected to the bottom wall. The top wall is connected to the stopping units. The bottom wall and the top wall have a gap therebetween to from a containing space. The elastic arm is disposed on the bottom wall and has a first protrusion. A passage is formed between the elastic arm and one of the stopping units passage and connected to the containing space, and the first protrusion is located in the passage. The magnet is adapted to resist an elastic force of the elastic arm to pass the passage along a first axis and at least partially move into the containing space. When the magnet is at least partially located in the containing space, a part of the stopping units stop the magnet from moving along a second axis, the bottom wall and the top wall stop the magnet from moving along a third axis, and the first protrusion stops the magnet from moving along the first axis. The first axis is perpendicular to the second axis, and the third axis is perpendicular to the first axis and to the second axis.

In an embodiment of the invention, the stopping units include a first side wall, a first connection portion and a second side wall. The passage is formed between the first side wall and the elastic arm. The first connection portion is connected to the elastic arm. When the magnet is at least partially located in the containing space, the magnet is limited between the first side wall and the first connection portion along the second axis. The second side wall is perpendicular to the first side wall. When the magnet is at least partially located in the containing space, the magnet is limited between the first protrusion and the second side wall along the first axis.

In an embodiment of the invention, the magnet fixing structure further includes a second connection portion connected to the bottom wall. Two ends of the elastic arm are respectively connected to the first connection portion and the second connection portion.

In an embodiment of the invention, the first side wall has a second protrusion aligned to the first protrusion. When the magnet is located in the containing space, the second protrusion stops the magnet from moving along the first axis.

In an embodiment of the invention, the magnet fixing structure further includes two guiding units connected to the bottom wall, and each of the guiding units has a guide slope. A guiding recess is formed between the guide slopes and connected to the passage.

In an embodiment of the invention, the elastic arm has at least one bent portion.

In an embodiment of the invention, the first protrusion protrudes toward the passage along the second axis.

Based on the above, in the magnet fixing structure of the invention, the first protrusion of the elastic arm can stop the magnet along the first axis, the stopping units can stop the magnet along the second axis, and the bottom wall and the top wall can stop the magnet along the third axis so as to limit the magnet from moving along each of the axes. In this way, the magnet is prevented from departing from the magnet fixing structure. Additionally, the magnet is limited in the containing space by the first protrusion of the elastic arm. By doing so, as long as the magnet resists the elastic force of the elastic arm, the elastic arm is elastically deformed, such that the magnet can be easily assembled and disassembled, which facilitates in a rework process.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
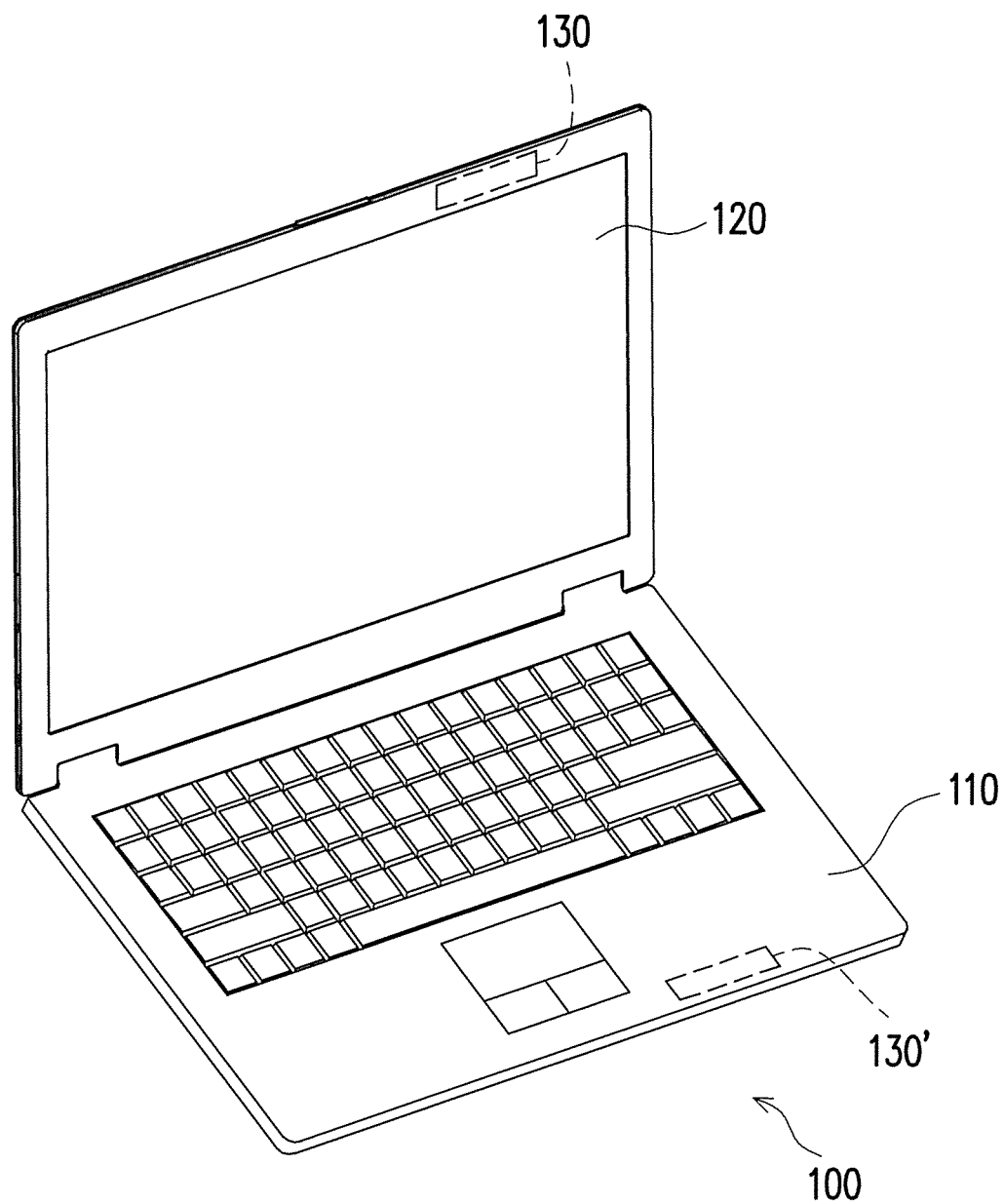
FIG. 1 is a perspective view of an electronic device according to an embodiment of the invention.

FIG. 1 is a perspective view of an electronic device according to an embodiment of the invention. With reference to FIG. 1, an electronic device 100 of the present embodiment is, for example, a notebook computer and includes a first body 110, a second body 120 and a magnet fixing structure 130. The first body 110 and the second body 120 are respectively, for example, a host and a display device of the notebook computer and are pivoted to each other. The magnet fixing structure 130 is disposed on the second body 120, and when the second body 120 is closed relatively to the first body 110, the electronic device 100 may be maintained in a closed state by a magnetic attraction force between the magnet and the first body 110 in the magnet fixing structure 130 to prevent the second body 120 from being unexpectedly opened relatively to the first body 110 due to an external force.

Figure 2:
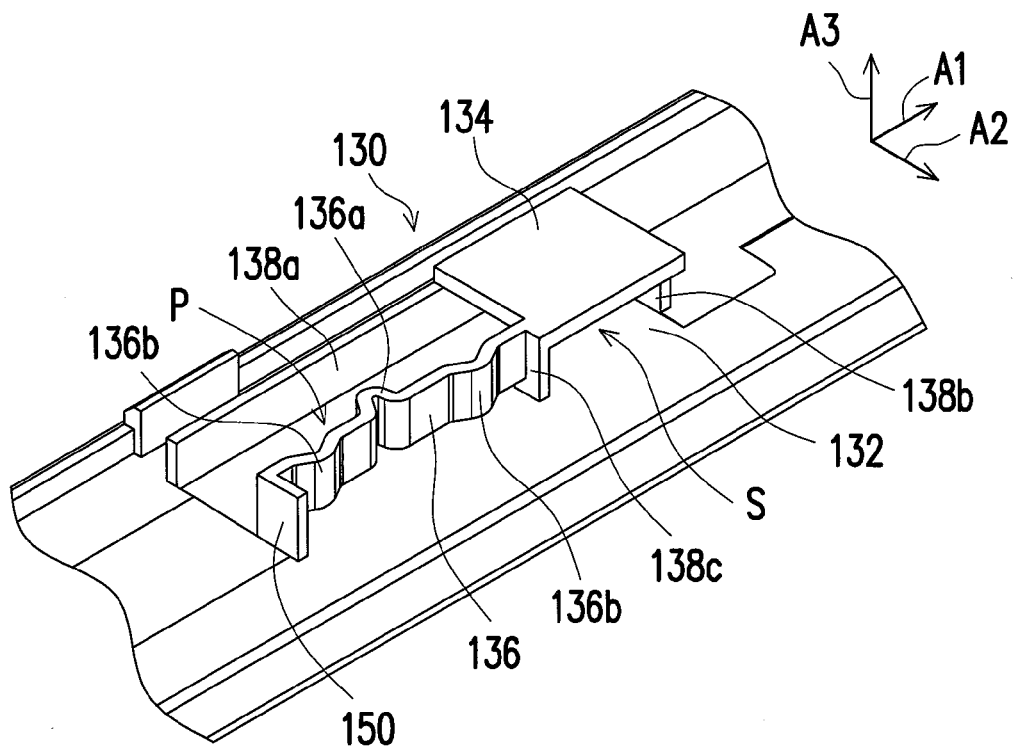
FIG. 2 is a perspective view of the magnet fixing structure depicted in FIG. 1.
Figure 3:
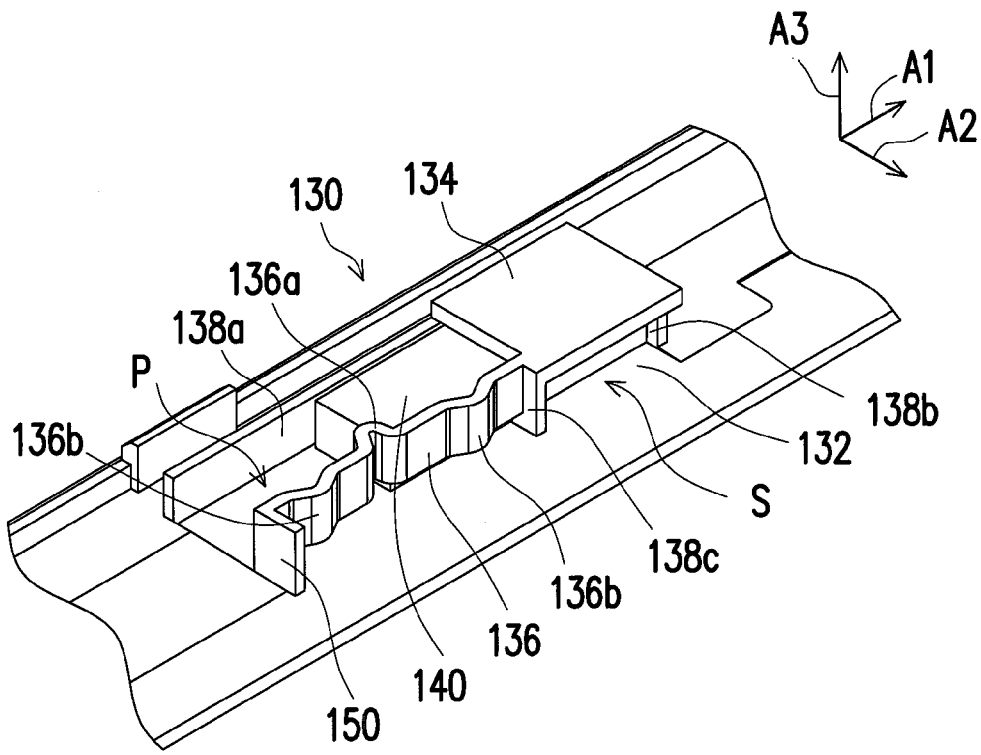
FIG. 3 illustrates a magnet assembled to the magnet fixing structure depicted in FIG. 2.

FIG. 2 is a perspective view of the magnet fixing structure depicted in FIG. 1. FIG. 3 illustrates a magnet assembled to the magnet fixing structure depicted in FIG. 2. With reference to FIG. 1 and FIG. 2, the magnet fixing structure 130 of the present embodiment includes a bottom wall 132, a top wall 134, an elastic arm 136 and a plurality of stopping units (labeled as 138a through 138c). The stopping units include a first side wall 138a, a second side wall 138b and a first connection portion 138c which are perpendicular to the first side wall 138a. The first side wall 138a, the second side wall 138b and the first connection portion 138c are all connected to the bottom wall 132. The top wall 134 is connected to the first side wall 138a, the second side wall 138b and the first connection portion 138c, and a space is present between the bottom wall 132 and the top wall 134 so as to form a containing space S. The elastic arm 136 is disposed on the bottom wall 132 and connected to the first connection portion 138c and has a first protrusion 136a. A passage P is formed between the elastic arm 136 and the first side wall 138a of the stopping units. The passage P is connected to the containing space S, and the first protrusion 136a of the elastic arm 136 is located in the passage P.

Figure 4:
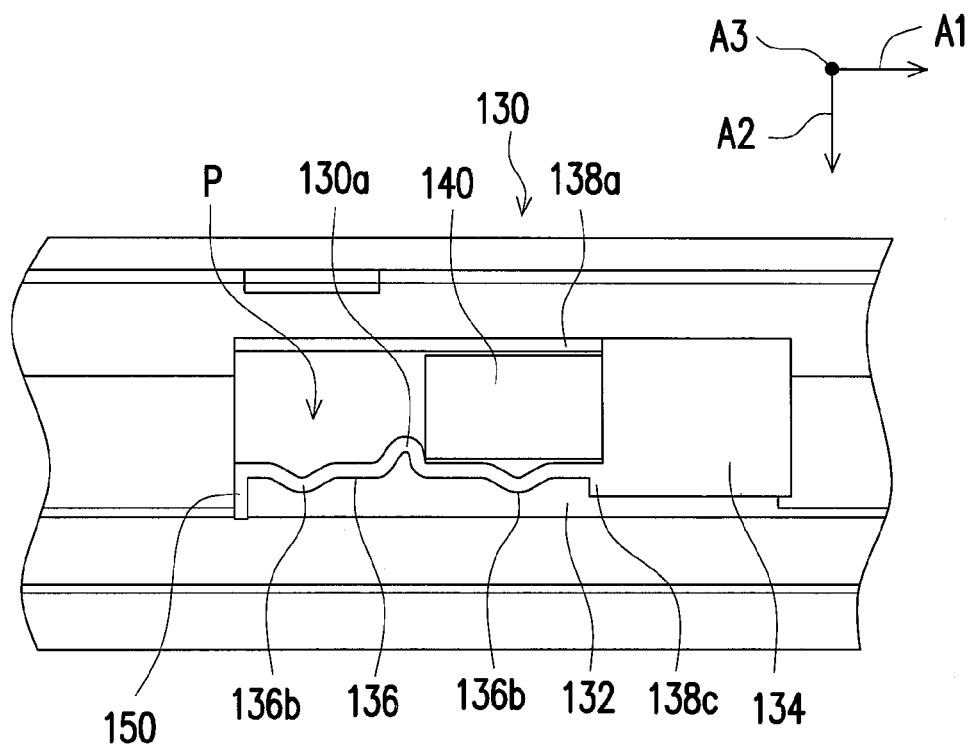
FIG. 4 is a top view of the magnet fixing structure depicted in FIG. 3.

FIG. 4 is a top view of the magnet fixing structure depicted in FIG. 3. The magnet 140 is adapted to resist an elastic force of the elastic arm 136 to pass the passage P along a first axis A1 so as to at least partially move into the containing space S, as shown in FIG. 3 and FIG. 4. When the magnet 140 is at least partially located in the containing space S, the magnet 140 is limited between the first side wall 138a and the first connection portion 138c along a second axis A2. Thereby, a part of the stopping units (i.e., the first side wall 138a and the first connection portion 138c) stop the magnet 140 from moving along the second axis A2, and the bottom wall 132 and the top wall 134 stop the magnet from moving along a third axis A3. The magnet 140 is limited between the first protrusion 136a and the second side wall 138b along the first axis A1, such that the first protrusion 136a and the second side wall 138b stops the magnet 140 from moving along the first axis A1. The first axis A1 and the second axis A2 are parallel to the bottom wall 132 and perpendicular to each other, and the third axis A3 is perpendicular to the first axis A1 and the second axis A2.

In the aforementioned configuration, the magnet fixing structure 130 stops the magnet 140 along the first axis A1 by the first protrusion 136a of the elastic arm 136, stops the magnet 140 along the second axis A2 by the first side wall 138a and the first connection portion 138c of the stopping units, and stops the magnet 140 along the third axis A3 by the bottom wall 132 and the top wall 134, such that the magnet 140 is stably limited from moving along each of the axes and prevented from departing from the magnet fixing structure 130. Additionally, the magnet 140 is limited in the containing space S by the first protrusion 136a of the elastic arm 136. By doing so, as long as the magnet 140 resists the elastic force of the elastic arm 136, the elastic arm 136 is elastically deformed, such that the magnet 140 is easily assembled and disassembled, which facilitates in a rework process.

With reference to FIG. 1, the electronic device 100 of the present embodiment has another magnet fixing structure 130'. The magnet fixing structure 130' is disposed on the first body 110 and serves to fix another magnet, such that the first body 110 and the second body 120 may be maintained in a closed state by the magnetic attraction force between the two magnets. The deposition and operation of the magnet fixing structure 130' are, for example, the same as those of the magnet fixing structure 130 and will not be repeatedly described hereinafter. In other embodiments, the magnet fixing structure 130 and the magnet fixing structure 130' may be disposed on any other proper positions on the bodies of the electronic device, which are not limited in the invention.

With reference to FIG. 2 and FIG. 3, the magnet fixing structure 100 of the present embodiment further includes a second connection portion 150 connected to the bottom wall 132. The elastic arm 136 is not only connected to the first connection portion 138c but also connected to the second connection portion 150. With two ends respectively connected to the first connection portion 138c and the second connection portion 150, the elastic arm 136 has better structure strength to reduce the probability of being damaged. Moreover, the elastic arm 136 has at least one bent portion 136b (illustrated as two herein). With the bent portions 136b formed in the elastic arm 136, the elastic deformation capability of the elastic arm 136 may be improved, such that the magnet 140 can be assembled and disassembled more smoothly.

In the present embodiment, the first protrusion 136a of the elastic arm 136 protrudes toward the passage P along the second axis A2 which is parallel to the bottom wall 132, instead of protruding from up to down along the third axis A3. Thereby, the thickness of the magnet fixing structure 100 along the third axis A3 is prevented from being increased due to the disposition of the elastic arm 136, and as a result, the appearance of the electronic device 100 (illustrated in FIG. 1) can be thinner.

Figure 5:
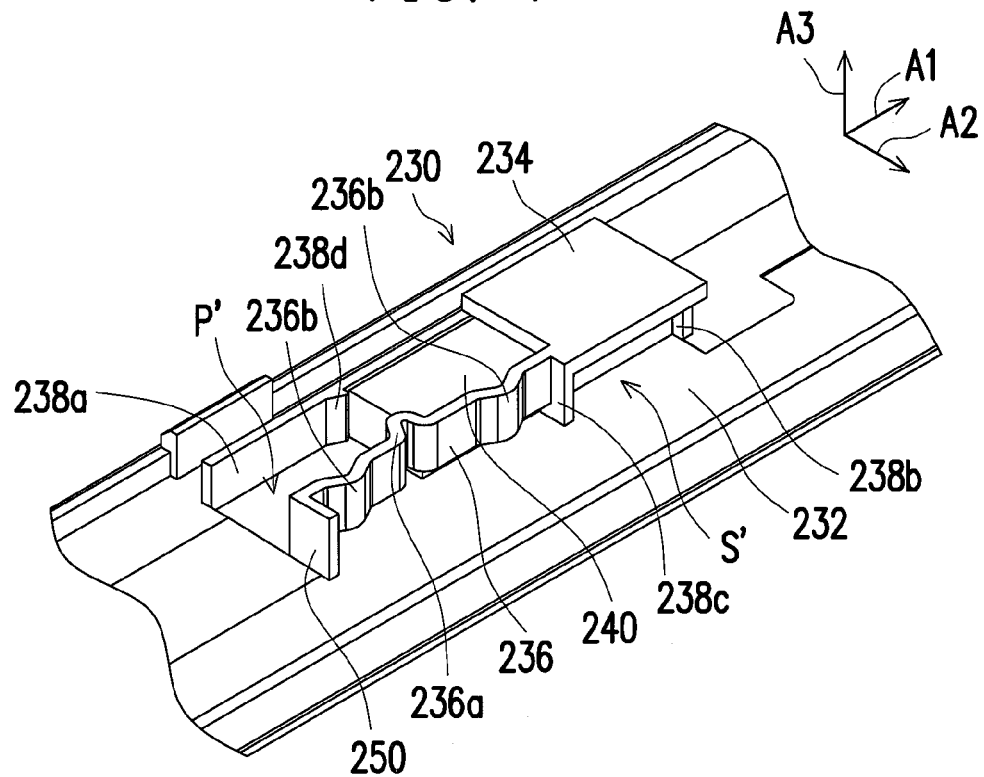
FIG. 5 is a perspective view of a magnet fixing structure according to another embodiment of the invention.

FIG. 5 is a perspective view of a magnet fixing structure according to another embodiment of the invention. FIG. 5 illustrates a magnet fixing structure 230 including a bottom wall 232, a top wall 234, an elastic arm 236, a first protrusion 236a, a bent portion 236b, a magnet 240, a first side wall 238a, a second side wall 238b, a first connection portion 238c, a second connection portion 250, a passage P' and containing space S' having disposition and operation that are similar to the bottom wall 132, the top wall 134, the elastic arm 136, the first protrusion 136a, the bent portion 136b, the magnet 140, the first side wall 138a, the second side wall 138b, the first connection portion 138c, the second connection portion 150, the passage P and the containing space S illustrated in FIG. 3 and will not be repeatedly described hereinafter. The magnet fixing structure 230 is different from the magnet fixing structure 130 in that the first side wall 238a has a second protrusion 238d. The second protrusion 238d is aligned to first protrusion 236a of the elastic arm 236. When the magnet 240 is located in the containing space S', the first protrusion 236a together and the second protrusion 238d jointly stop the magnet 240 from moving along the first axis A1 so as to fix the magnet 240 more stably.

Figure 6:
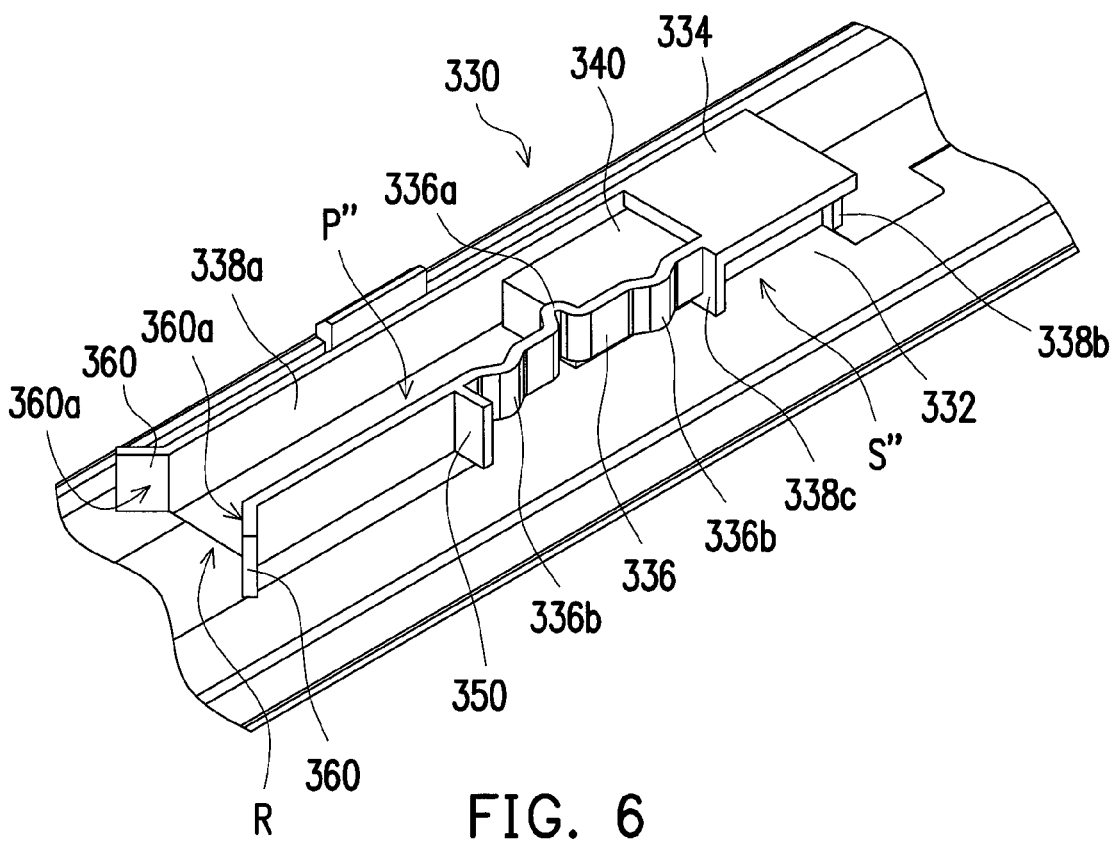
FIG. 6 is a perspective view of a magnet fixing structure according to yet another embodiment of the invention.
Figure 7:
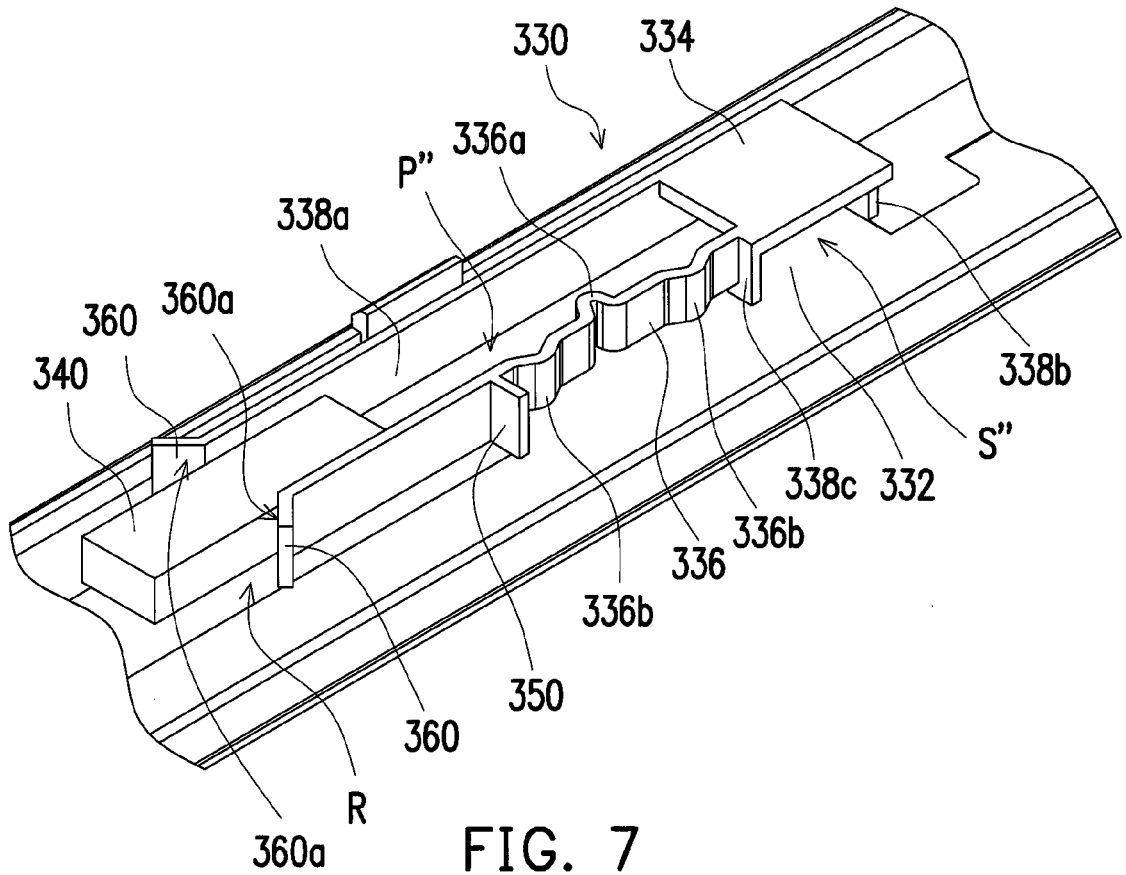
FIG. 7 is a schematic view showing the pass magnet passing the guiding recess depicted in FIG. 6.

FIG. 6 is a perspective view of a magnet fixing structure according to yet another embodiment of the invention. FIG. 7 is a schematic view showing the pass magnet passing the guiding recess depicted in FIG. 6. FIG. 6 and FIG. 7 illustrate a magnet fixing structure 330 including a bottom wall 332, a top wall 334, an elastic arm 336, a first protrusion 336a, a bent portion 336b, a magnet 340, a first side wall 338a, a second side wall 338b, a first connection portion 338c, a second connection portion 350, a passage P" and a containing space S" having the disposition and operation that are similar to having disposition and operation that are similar to the bottom wall 132, the top wall 134, the elastic arm 136, the first protrusion 136a, the bent portion 136b, the magnet 140, the first side wall 138a, the second side wall 138b, the first connection portion 138c, the second connection portion 150, the passage P and the containing space S illustrated in FIG. 3 and will not be repeatedly described hereinafter. The magnet fixing structure 330 is different from the magnet fixing structure 130 in that the magnet fixing structure 330 further includes two guiding units 360. The guiding units 360 are connected to the bottom wall 332 and respectively connected to the first side wall 338a and the second connection portion 350. Each of the guiding units 360 has a guide slope 360a. A guiding recess R is formed between the two guide slopes 360a and connected to the passage P''. During the process of assembling the magnet 340, the magnet 340 may be guided by the two guide slopes 360a to move toward the passage P'' along the guiding recess R, as shown in FIG. 7, such that the magnet successfully moves into the containing space S'' along the passage P''', as shown in FIG. 6.

To sum up, in the magnet fixing structure of the invention, the first protrusion of the elastic arm can stop the magnet along the first axis, the stopping units can stop the magnet along the second axis, and the bottom wall and the top wall can stop the magnet along the third axis so as to limit the magnet from moving along each of the axes. In this way, the magnet is prevented from departing from the magnet fixing structure. Additionally, the magnet is limited in the containing space by the first protrusion of the elastic arm. By doing so, as long as the magnet resists the elastic force of the elastic arm, the elastic arm is elastically deformed, such that the magnet can be easily assembled and disassembled, which facilitates in a rework process. Moreover, with the two ends respectively connected to the first connection portion and the second connection portion, the elastic arm can have better structure strength to reduce the probability of being damaged.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:
1. A magnet fixing structure, adapted to fix a magnet, the magnet fixing structure comprising:
   a bottom wall;
   a plurality of stopping units, connected to the bottom wall;
   a top wall, directly connected to at least two of the stopping units, wherein the bottom wall and the top wall have a gap therebetween to from a containing space; and
   an elastic arm, disposed on the bottom wall and having a first protrusion,
   wherein a passage is formed between the elastic arm and one of the stopping units and connected to the containing space, the first protrusion is located in the passage, and the magnet is adapted to resist an elastic force of the elastic arm to pass the passage along a first axis and at least partially move into the containing space,
   wherein when the magnet is at least partially located in the containing space, a part of the stopping units stop the magnet from moving along a second axis, the bottom wall and the top wall stop the magnet from moving along a third axis, and the first protrusion stops the magnet from moving along the first axis, wherein the first axis is perpendicular to the second axis, and the third axis is perpendicular to the first axis and to the second axis,
   wherein when the magnet passes the passage, each of the stopping units is not elastically deformed.

2. The magnet fixing structure according to claim 1, wherein the stopping units comprise:
   a first side wall, wherein the passage is formed between the first side wall and the elastic arm;
   a first connection portion, connected to the elastic arm, wherein when the magnet is at least partially located in the containing space, the magnet is limited between the first side wall and the first connection portion along the second axis; and
   a second side wall, being perpendicular to the first side wall, wherein when the magnet is at least partially located in the containing space, the magnet is limited between the first protrusion and the second side wall along the first axis.

3. The magnet fixing structure according to claim 2, further comprising:
   a second connection portion, connected to the bottom wall, wherein two ends of the elastic arm are respectively connected to the first connection portion and the second connection portion.

4. The magnet fixing structure according to claim 2, wherein the first side wall has a second protrusion aligned to the first protrusion, and when the magnet is located in the containing space, the second protrusion stops the magnet from moving along the first axis.

5. The magnet fixing structure according to claim 2, further comprising:
   two guiding units, connected to the bottom wall and each having a guide slope, wherein a guiding recess is formed between the two guide slopes and connected to the passage.

6. The magnet fixing structure according to claim 1, wherein the elastic has at least one bent portion.

7. The magnet fixing structure according to claim 1, wherein the first protrusion protrudes toward the passage along the second axis.

8. An electronic device, comprising:
   a first body;
   a second body, pivoted to the first body;
   a magnet; and
   a magnet fixing structure, disposed on the first body or the second body and comprising:
      a bottom wall;
      a plurality of stopping units, connected to the bottom wall;
      a top wall, directly connected to at least two of the stopping units, wherein the bottom wall and the top wall have a gap therebetween to from a containing space; and
      an elastic arm, disposed on the bottom wall and having a first protrusion,
   wherein a passage is formed between the elastic arm and one of the stopping units and connected to the containing space, the first protrusion is located in the passage, and the magnet is adapted to resist an elastic force of the elastic arm to pass the passage along a first axis and at least partially move into the containing space,
   wherein when the magnet is at least partially located in the containing space, a part of the stopping units stop the magnet from moving along a second axis, the bottom wall and the top wall stop the magnet from moving along a third axis, and the first protrusion stops the magnet from moving along the first axis, wherein the first axis is perpendicular to the second axis, and the third axis is perpendicular to the first axis and to the second axis,
   wherein when the magnet passes the passage, each of the stopping units is not elastically deformed.

9. The electronic device according to claim 8, wherein the stopping units comprise:
   a first side wall, wherein the passage is formed between the first side wall and the elastic arm;
   a first connection portion, connected to the elastic arm, wherein when the magnet is at least partially located in the containing space, the magnet is limited between the first side wall and the first connection portion along the second axis; and
   a second side wall, being perpendicular to the first side wall, wherein when the magnet is at least partially located in the containing space, the magnet is limited between the first protrusion and the second side wall along the first axis.

10. The electronic device according to claim 9, wherein the magnet fixing structure further comprises:
   a second connection portion, connected to the bottom wall, wherein two ends of the elastic arm are respectively connected to the first connection portion and the second connection portion.

11. The electronic device according to claim 9, wherein the first side wall has a second protrusion aligned to the first protrusion, and when the magnet is located between the bottom wall and the top wall, the second protrusion stops the magnet from moving along the first axis.

12. The electronic device according to claim 9, wherein the magnet fixing structure further comprises:
   two guiding units, connected to the bottom wall and each having a guide slope, wherein a guiding recess is formed between the two guide slopes and connected to the passage.

13. The electronic device according to claim 8, wherein the elastic arm has at least one bent portion.

14. The electronic device according to claim 8, wherein the first protrusion protrudes toward the passage along the second axis.

* * * * *